April 19, 1932.  W. R. ZIMMERMAN  1,854,362
THERMOSTAT MECHANISM
Filed May 19, 1930   2 Sheets-Sheet 1

Inventor
William R. Zimmerman
By Slough and Canfield
Attorney

April 19, 1932. W. R. ZIMMERMAN 1,854,362
THERMOSTAT MECHANISM
Filed May 19, 1930 2 Sheets-Sheet 2
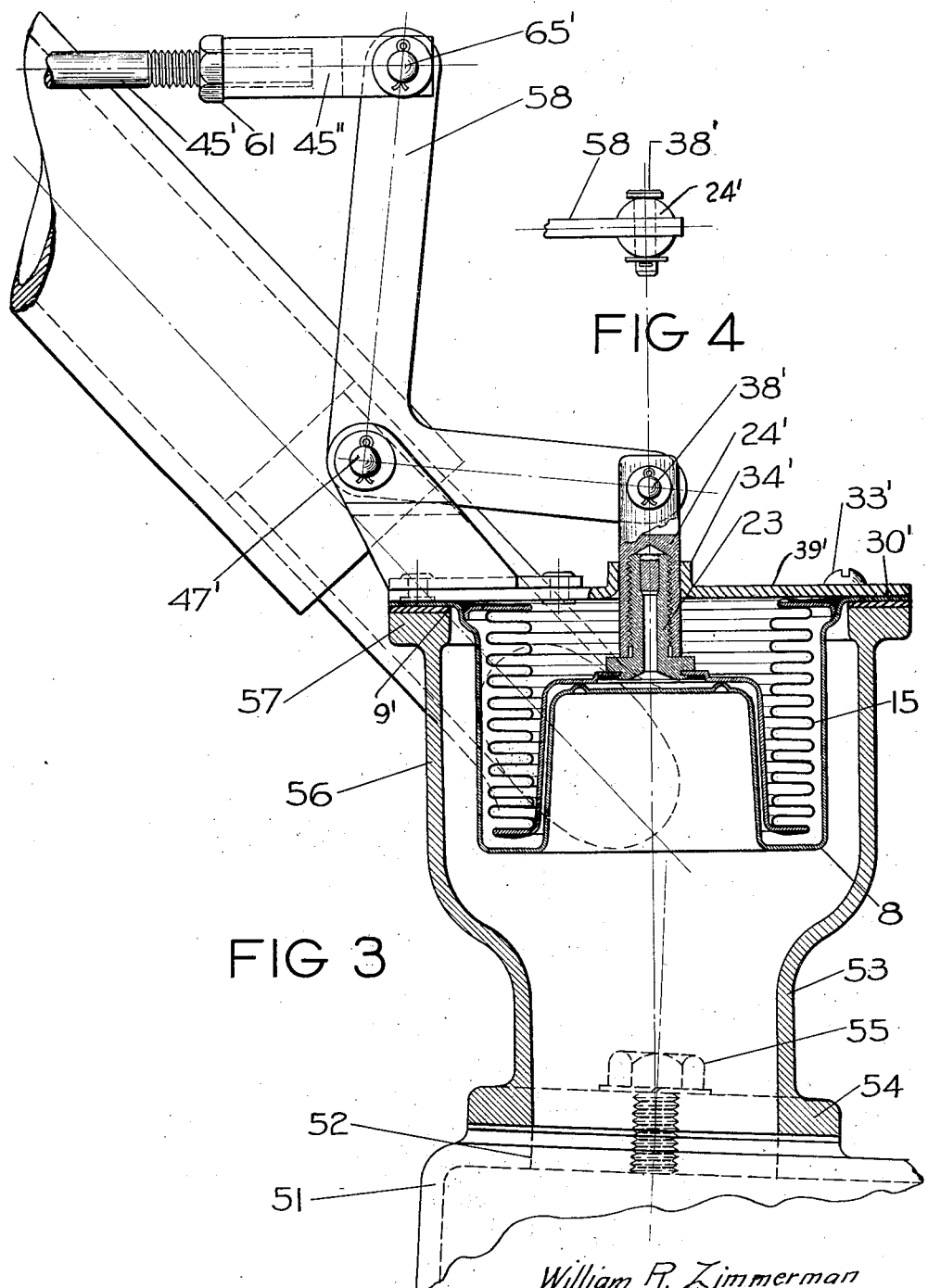

Patented Apr. 19, 1932

1,854,362

UNITED STATES PATENT OFFICE

WILLIAM R. ZIMMERMAN, OF CLEVELAND, OHIO, ASSIGNOR TO THE BISHOP & BABCOCK MFG. CO., OF CLEVELAND, OHIO, A CORPORATION OF OHIO

THERMOSTAT MECHANISM

Application filed May 19, 1930. Serial No. 453,599.

My invention relates to radiator shutter opening mechanisms and relates more particularly to such mechanisms as are thermostatically operable responsive to the temperature conditions of the cooling fluid circulated through the jacket of the automotive engine, with which the radiator is associated.

Water cooling automotive engines are commonly provided with a water cooling jacket surrounding the cylinders and including water passages through the head blocking for the engine, and water is passed through the jacket in a circulatory system under the influence of a water pump disposed therein to continuously cause the water to be exposed to the cooling effect of air when passed through a water cooling radiator.

Such radiators are well known and will require no specific description, as are also radiator shutters, commonly affixed to the forward face of the radiator and adapted to be simultaneously moved to open or closed position to permit air to be freely drawn through the radiator to cool the water passages thereof or to restrain the free flow of air therethrough to reduce the air cooling effect.

Thermostatic means such as a metallic bellows having a filling of volatile material exposed to the temperature of the cooling water, at various points in the water circulatory system, have been commonly employed, the thermostatic bellows or the like being secured so as to project into the upper tank portion of an automotive radiator, or at other points in the line of flow of water.

It is very desirable, at all times, that the thermostat respond quickly to any change of temperature to alter the controlled position of the radiator shutters, so that the temperature of the engine may be thereby quickly regulated to changes of temperature of its cooling fluid, to maintain such fluid within a given range of temperatures.

An object of the present invention is to provide an improved bellows thermostat for a system of the above type.

Another object of my invention is to provide an improved thermostatic mechanism involving a metallic bellows having lateral folded walls, in which the cooling water more quickly communicates its temperature, when varied, to the interior filling of the bellows thermostat.

Another object of my invention is to provide an improved thermostatic mechanism of the above character readily applicable to prevailing types of automotive vehicles.

Another object is to provide an improved bellows thermostatic mechanism which will operate with considerable power through being of very small size and occupying but a small space.

Another object of my invention is to provide a relatively inexpensive mechanism of the above character which, however, will be highly efficient in operation and which will resist the deleterious effects of long continued use.

Other objects of my invention will become apparent by reference to the following description of certain embodiments of my invention and in which the following drawings are referred to as illustrating the said embodiments.

Referring to the drawings:—

Fig. 3 is a vertical medial sectional view of a modified form of thermostatic mechanism shown as affixed to the head of an automotive engine cylinder block together with certain of the associated parts, including motion communicating links shown fragmentarily in elevation;

Fig. 4 is a plan view of certain of said links shown in Fig. 3.

Figures 1, 2:
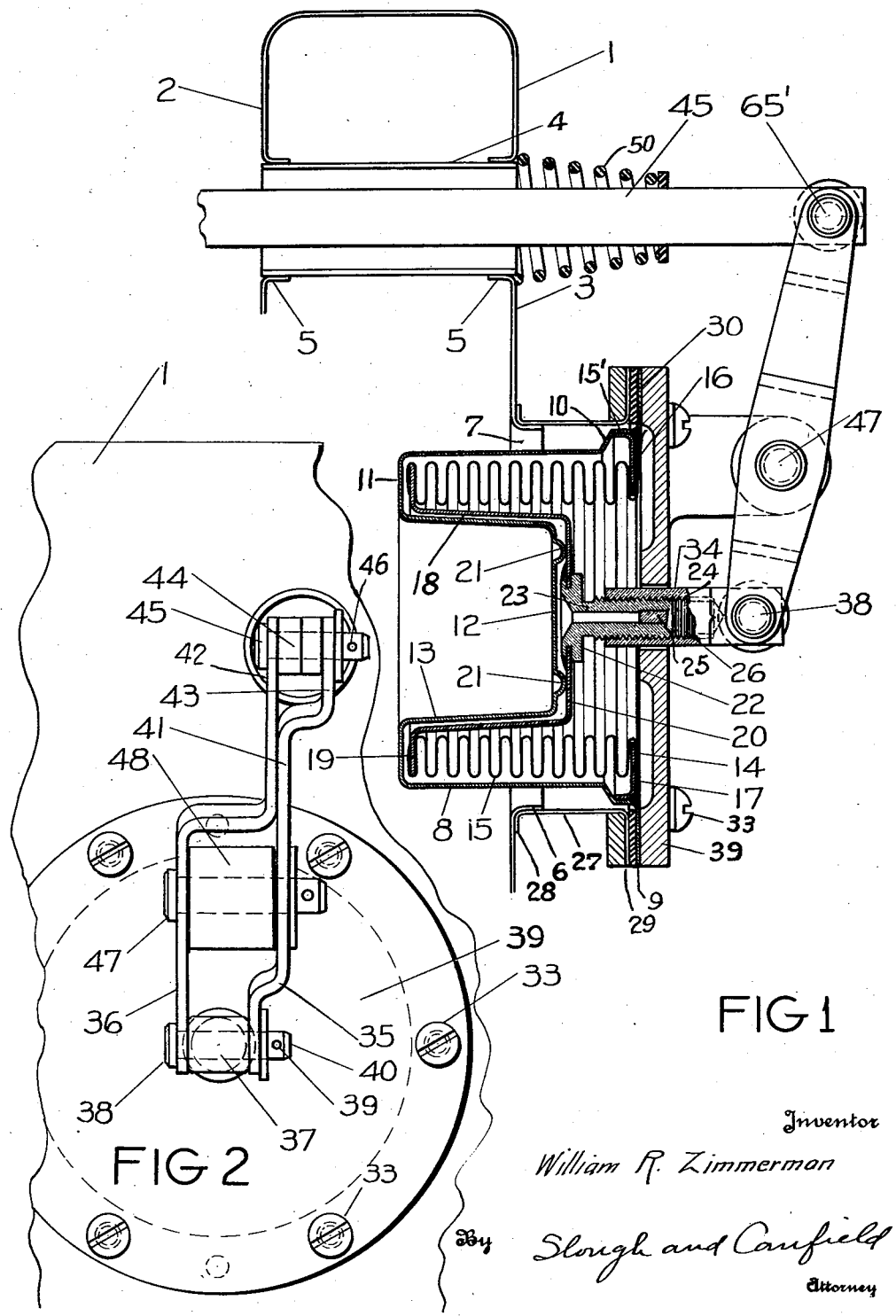
Fig. 1 is a vertical medial sectional view through a thermostatic mechanism and the associated parts of the tank portion of an automotive radiator to which it is attached together with certain of the motion communicating links associated therewith.
Fig. 2 is a rear elevational view of the apparatus illustrated in Fig. 1.

Referring now first to Figs. 1 and 2 of the drawings, in both of which like parts are designated by like reference characters, at 1 I show the upper tank portion of an automobile radiator having a front wall 2 and a rear wall 3 through aligned apertures of which a tube 4 is projected and soldered at its ends to the interior surfaces of tubular flanges 5 of the front and rear tank walls bordering said apertures.

A rearwardly extending tubular flange 6 formed integrally with the rear wall 3, preferably below the flanges 5, borders an aperture 7 through which a thermostatic casing element 8 is projected. The casing 8 is in the form of a cup having a radial rim flange 9 joined to the lateral tubular walls of the cup by an intermediate stepped portion 10. The cup is provided with an end wall 11 having a central reentrant cup-like element 12, which reentrantly projects within the tubular walls 8 and which comprises a slightly tapered tubular connecting portion 13.

Within the said stepped portion 10 of the cup casing, an annular support 14 for one end of a tubular metallic bellows 15 is provided, said support having an integral tubular flange 15' and a radial flange 16 projecting inwardly radially therefrom, the tubular flange 15 being telescoped within the said stepped portion 10 of the casing, and the radial flange being soldered to the rim portion of the cup, by its exterior surface, the soldering being shown at 17. The other end of the bellows is supported by a centrally apertured cup-like element 18, formed of sheet metal, similarly to the cup 8, and which is telescoped over the reentrant cup-like element 12 of the casing end wall, the reentrant portion of the casing wall and the cup element 18 being in what is commonly termed nested relation, and the centrally perforated end portion 20 of the element 18 and its tubular portion being preferably, normally, but slightly spaced from the corresponding opposing walls of the said reentrant casing portion. The cup element 18 is provided with an outwardly extending radial rim flange 19 to which the other end of the tubular bellows wall 15 is secured by soldering a fold which encompasses the outer portion of said flange.

A plurality of projections 21 preferably at least three in number, spaced around the axis of the reentrant wall portion 12, is adapted to engage with the wall portion 20 of the element 18 to maintain the above referred to spaced relation therebetween.

A filling tubular inlet 22 is projected into the central aperture of the wall 20 of the bellows and is soldered in such position to make a leak proof joint with the portions of the wall bordering the aperture, and projects reentrantly through the tubular walls of the bellows by a tubular stem portion 23, which is exteriorly threaded. In the drawings, a motion communicating link 24 having a tubular portion is telescoped thereby over the exteriorly threaded stem 23 being screwthreaded thereon, and is therefore longitudinally adjustable thereon.

Prior to the placement of the tubular links 24 on the stem 23, a volatile liquid is supplied through the bore of the tubular stem 23 to the space intermediate the tubular bellows 15, and also intermediate the reentrant wall portions 12 and 13 of the thermostat casing 8, and the cup-shaped end wall 18 with its end portion 20, this filling operation being accomplished at a temperature preferably below that of evaporation of the liquid. However, the thermally responsive fluid may be supplied in the form of a gas or otherwise, although usually liquids, such as ether, carbon bi-sulphide or the like are employed for the filling at temperatures to which they are usually in liquid form.

After the filling has proceeded and which may or may not be accomplished under more than an atmospheric pressure, or subsequent to the effecting of a vacuum within the above mentioned spaces intermediate the bellows and the casing, the filling bore of the tubular stem 23 is plugged by a plug 25 projected in the end thereof and which is soldered into place, as indicated at 26.

The thermostatic mechanism above described is secured in place as shown, by mounting means therefor comprising a tubular support 27 having outwardly extending terminal radial flanges 28 and 29, the first of which encompasses the flange 6 of the radiator tank 1, and the second of which forms a support for the rim flange 9 of the bellows casing 8.

A centrally apertured disk 39 is superposed over the open end of the tubular bellows 8, the border portions of its inner face abutting against the outer surfaces of said flange and serves to clamp the bellows by said casing flange 9 to the flange 29 of the tubular support 27. To accomplish this, a water sealing gasket 30 is interposed between the casing rim flange 9 and the flange 29 of the tubular support and a clamping ring 31 is disposed over the tubular web of the element 27 against the opposite face of the radial flange 29 and a plurality of spaced screws 33 are projected through the border portion of the centrally apertured disk 39 and said superposed casing flange 9, gasket 30, support flange 29 and into the clamping ring 31, into which it is screwthreaded to securely clamp the superposed parts, named, together. The gasket 30 prevents leakage of water from the radiator tank.

The disk 39 has a central aperture 34 through which the motion communicating link 24 screwthreaded on the stem 23 is projected.

The head of the link 24 is preferably solid and flattened on its two sides which are embraced by a pair of parallel arms 35 and 36 of a second communicating link element, which are secured to the said head shown at 37, by a pin 38 projected through both said arms and the interposed head 37, said pin being provided with a cotter pin 39 projected through its end 40.

The arms 35 and 36 are preferably secured together by intermediate portions 41 by welding or the like, and have relatively spaced ends 42 and 43 similar to the opposite ends of the arms 35 and 36, which embrace between them an end 44 of a thrust rod 45 projected through the tube 4. The end of the rod 45 is preferably flattened as shown, and the arms 42 and 43 are secured to the end of the rod by a headed pin 65 projected through the end of both said arms and through the end of the rod 45, a cotter pin 46 preventing a removal of said pin.

It will be understood that longitudinal reciprocation of the rod 45 when effected by the expansion and/or contraction of the vapor interposed between the opposing wall portions of the bellows and its enclosing casing, will communicate opening and closing movements to the shutters of the radiator, which are not illustrated in the drawing, and whose structure is so well known as not to require illustration herein. The connection between the operating lever of the shutters and the rod 45 is such that upon a forward thrust movement of the rod 45, that is toward the left, as shown in the drawing, the shutters will be opened, this occurring only upon a condition of high temperature of the water in the radiator tank causing expansion of the volatile liquid in the thermostat.

Such expansion of the volatile liquid, which is trapped between the outer walls of the bellows including the cup wall element 18 and the inner walls of the casing 8 including its reentrant portion 12—13 will tend to cause the bellows to contract, that is to be of decreased length and the successive folds thereof to be still further folded. This effects a thrust movement of the wall 20 communicated to the tubular element 23 and link 24 and rotates the lever which is formed by the joined elements 35 and 36 about the pin 47 which projects through both of said arms and also an intermediately disposed projecting support 48 integrally secured on the outer face of the disk 39, to thrust the end portions 42 and 43 of the composite 35—36 in such a direction as to move the rod 45 longitudinally towards the left as shown in Fig. 1.

Therefore, through such operation, upon an increase of temperature of water in the tank 1, which is communicated through the walls of the cup-shaped casing 8 to the volatile liquid contained therebetween and the bellows element telescoped therein to vaporize and/or expand said liquid, the rod 45 will be moved in such a direction as to open the shutters to permit more air to flow through the radiator and to increase the cooling effect thereof upon water passing therethrough.

The form of the casing 8 and the wall 18—20 of the bellows element accomplishes a very ready and intimate convection of heat through the walls of the casing to the volatile liquid contained in the casing which is constrained to be spread out in a very thin layer immediately in contact with the reentrantly formed cup casing walls.

Upon a reduction in temperature of the liquid, the opposite movements will be effected, a spring associated with the shutter mechanism serving to retract the rod 45 to move it toward the right as shown in Fig. 1.

In Fig. 1 a compression spring is indicated at 50 merely in a diagrammatic manner, in substitution of the shutter spring, which is not shown, to illustrate the functional characteristic of the shutter spring and in fact such a spring 50 illustrated as shown would perform the functions of the shutter spring relative to the apparatus disclosed herein.

Referring now to the embodiment of my invention illustrated in Figs. 3 and 4, at 51 I show an automotive engine cooling jacket wall comprised in the head of the engine cylinder block which is apertured at 52 and over which aperture a tubular thermostat support 53 is placed secured by its bottommost flange 54 to the top wall of the packet. Bolts 55 projected through said flange into said jacket wall secure the support thereto. The tubular support 53 is preferably enlarged at 56 approaching its upper end which is provided with a rim flange 57. The bellows mechanism of Fig. 1, described in connection therewith is adapted to be secured by a clamping plate 39 to the rim flange 57 by screws 33' projected through the border portions of the plate, the radial rim flange 9' of the bellows casing 8', the gasket 30' into the said support flange 57.

The tubular bellows 15 is preferably in substantially vertical position and in this embodiment, I have chosen to show the plate 39' of sheet metal with a tubular flange 34' bordering the central aperture thereof and forming a guide for the motion communicating link 24', which is adjustably screwthreaded onto the tubular filling inlet element 23.

From the description of the foregoing embodiment, the operation of the mechanism shown in Figs. 3 and 4 will be understood when it is explained that the rod 45' is adapted for longitudinal reciprocation precisely according to the manner of the rod 45 and is projected at its end, not shown, preferably through such a tube, as that shown at 4, Fig. 1, of the radiator upper tank portion, such as 1, and when reciprocated will operate shutters affixed to the front of the radiator in the manner previously related for the rod 45.

In this embodiment, a bell crank lever 58 journalled on a pin 47' interconnects the link 24' to the rod 45' to communicate motion from said link to said rod, the ends of the arms of the bell crank lever being hingedly secured to the link 24′ and a connector 45″ respectively by pins 38′ and 65′, respectively. The connector 45″ embraces the end of the bell crank lever to which it is attached by a bifurcated end portion, which is pierced to receive the pin 65′ and is screw-threaded at its other end onto the screw-threaded end of the rod 45′. A set nut 61 makes the longitudinal adjustment between the connector and rod 45′ permanent when positioned against the end of the connector. Fig 4 shows the hinging connection between the pin 38′, the end of the link 24′, and the bell crank lever 58. It is noted that the end of the link 24′ is bifurcated and the end of the lever 58 is projected between the forks thereof, said forks and the end of the lever having aligned apertures through which the pin 48′ has passed.

Having thus described my invention in certain embodiments, I am aware that numerous and extensive departures may be made from the embodiments herein illustrated and described, without departing from the spirit of my invention.

I claim:

1. A thermostatic mechanism comprising a pair of nested cups each with relatively nested lateral walls and reentrant end walls, the nested walls of one cup being spaced from the nested walls of the other cup and being adapted to receive and contain a quantity of thermally expansible fluid in the intermediate space, one of said cups having thin metallic tubular lateral walls, having annular folds therein, and a closure for the space between the walls of the nested cups comprising an annulus bridging the rim portions thereof.

2. A thermostatic mechanism comprising a pair of nested cups each with relatively nested lateral walls and reentrant end walls, the nested walls of one cup being spaced from the nested walls of the other cup and being adapted to receive and contain a quantity of thermally expansible fluid in the intermediate space, one of said cups having thin metallic tubular lateral walls, having annular folds therein, and a closure for the space between the walls of the nested cups comprising an annulus bridging the rim portions thereof, and a reciprocable motion-communicating rod affixed to the reentrant end wall of the innermost cup, projecting longitudinally into the cup therefrom.

3. A thermostatic mechanism comprising a pair of nested cups each with relatively nested reentrant end walls, one of said cups having thin metallic tubular lateral walls, having annular folds therein, and a closure for the space between the walls of the nested cups comprising an annulus bridging the rim portions thereof, and a radial flange for the united cup rims extending laterally therefrom, adapted to be secured to the lateral walls of a fluid conduit to support said mechanism.

4. A thermostat comprising a pair of nested sheet metal cup like elements having side and end walls disposed in parallel closely adjacent relation, each provided with a radially extending rim flange, the flange for the inner cup element extending outwardly slightly beyond the other cup flange, a tube joined by an end to the outwardly extending flange of the inner cup element and surrounding the cup elements, a longitudinally flexible annularly folded tube joined by an end to the other flange disposed between the outermost cup element and said first tube, the other ends of the said tubes being secured together to provide a closed thin casing for reception of a thermally expansible liquid introduced therein.

5. A thermostat comprising a pair of relatively nested cups each approximately of M-form in diametrical sections and comprising relatively telescoped outer tubular walls, and reentrant cup-shaped end walls having outwardly extending rim flanges supporting the tubular walls, the tubular wall for the innermost cup formed with a series of laterally directed folds and of thin relatively resilient material, said cups joined together by the free ends of their outer tubular walls to form a volatile liquid containing a thin chamber between the outer tubular walls and the cup-shaped end walls.

6. A thermostatic mechanism comprising a pair of relatively nested cups, each with relatively nested cup shaped reentrant end walls, the said end walls and the lateral walls of each of the cups being disposed in closely adjacent approximately parallel spaced relation, the lateral walls of the inner cup composed of thin metallic material and having annular folds therein, the open edge portions of the lateral walls of the cups being secured together in a leak proof manner to provide a closed thin casing for containing thermally expansible fluid introduced between the lateral and reentrant end walls of the two cups.

7. A thermostat comprising a pair of relatively nested metallic cups each alike approximately M-form in diametrical sections having their outer walls secured together in a leak proof manner at the cup mouths, the outer wall of the inner cup being of thin metallic sheet metal and having a series of annular folds and a thermally expansible fluid interposed between the adjacent like walls of the cups.

8. A thermostat comprising a pair of relatively nested metallic cups each alike approximately M-form in diametrical sections having their outer walls secured together in a leak proof manner at the cup mouths, the outer wall of the inner cup being of thin metallic sheet metal and having a series of annular folds and a thermally expansible fluid interposed between the adjacent like walls of the cups, and a thrust element extending longitudinally from the inner wall of the inner cup, longitudinally reciprocable upon variations in temperature of fluid contacting with the outer walls of the outer cup, consequent to heat conducted thereby to the thermally expansible fluid between the cups.

9. A thermostat comprising a pair of relatively nested metallic cups each alike approximately M-form in diametrical sections having their outer walls secured together in a leak proof manner at the cup mouths, the outer wall of the inner cup being of thin metallic sheet metal and having a series of annular folds and a thermally expansible fluid interposed between the adjacent like walls of the cups, and a thrust element extending longitudinally from the inner wall of the inner cup, longitudinally reciprocable upon variations in temperature of fluid contacting with the outer walls of the outer cup, consequent to heat conducted thereby to the thermally expansible fluid between the cups, and means forming a bearing for said reciprocable means bridging the open mouth of the nested cups.

In testimony whereof I hereunto affix my signature this 18th day of April, 1930.

WILLIAM R. ZIMMERMAN.